United States Patent [19]
Sanford et al.

[11] Patent Number: 6,038,303
[45] Date of Patent: *Mar. 14, 2000

[54] METHOD AND APPARATUS FOR REMOTELY ACTIVATING SERVICES IN A TELECOMMUNICATIONS NETWORK

[75] Inventors: David A. Sanford, Santa Rosa; Robert D. Connolly, Windsor; Dave S. Collis, Santa Rosa, all of Calif.

[73] Assignee: Alcatel USA Sourcing, L.P., Plano, Tex.

[ * ] Notice: This patent is subject to a terminal disclaimer.

[21] Appl. No.: 09/332,779

[22] Filed: Jun. 14, 1999

Related U.S. Application Data

[63] Continuation of application No. 08/775,723, Dec. 31, 1996, Pat. No. 5,912,960.
[60] Provisional application No. 60/017,894, May 17, 1996.

[51] Int. Cl.⁷ .................................................. H04M 3/42
[52] U.S. Cl. ........................... 379/201; 379/334; 379/335
[58] Field of Search ................................. 379/201, 333, 379/334, 335, 336, 207, 220

[56] References Cited

U.S. PATENT DOCUMENTS

| | | | |
|---|---|---|---|
| 3,704,348 | 11/1972 | McIntosh et al. | 379/35 |
| 3,863,033 | 1/1975 | Chen et al. | 379/333 |
| 3,882,281 | 5/1975 | Grundy et al. | 379/15 |
| 4,258,231 | 3/1981 | Lenz et al. | 379/246 |
| 4,300,207 | 11/1981 | Eivers et al. | 710/131 |
| 4,833,708 | 5/1989 | Goodrich | 379/334 |
| 5,259,027 | 11/1993 | Winter et al. | 379/221 |
| 5,276,727 | 1/1994 | Kim et al. | 379/29 |
| 5,353,339 | 10/1994 | Scobee | 379/207 |
| 5,386,454 | 1/1995 | Childs-Goodrich et al. | 379/27 |
| 5,459,718 | 10/1995 | Kusano | 370/217 |
| 5,500,753 | 3/1996 | Sutherland | 359/125 |
| 5,912,960 | 6/1999 | Sanford et al. | 379/201 |

FOREIGN PATENT DOCUMENTS 0317852  5/1989  WIPO .

OTHER PUBLICATIONS

Article, Management des CCS#7–Netzes: ein evolutionärer Ansatz, by Peter Schmid, Christian Ris, Bjorn Sæteroy, tec Das technische Magazin von ASCOM, Feb. 1994, pp. 8–17.
PCT Search Report, dated May 16, 1997, for PCT/US 97/08431, 7 sheets.

*Primary Examiner*—Scott Wolinsky
*Assistant Examiner*—Benny Q. Tieu
*Attorney, Agent, or Firm*—Baker Botts L.L.P.

[57] ABSTRACT

A service and facility initiation device (10) includes a first relay matrix (12) and a second relay matrix (14) coupled by an initiation bus (16). The first relay matrix (12) includes relays (30) that provide service feeds to primary/redundant and secondary service drops from primary and secondary in-service feeds received at the first relay matrix (12) and additional service feeds from the second relay matrix (14) via the initiation bus (16). The second relay matrix (14) includes relays (34) to place additional service feeds onto the initiation bus (16). The service and facility initiation device (10) includes a modem (28) or other communications interface that receives external control information to remotely operate relay drivers (20) for appropriate configuration of the relays (30 and 34) according to the service needs and requests of local customers.

4 Claims, 10 Drawing Sheets

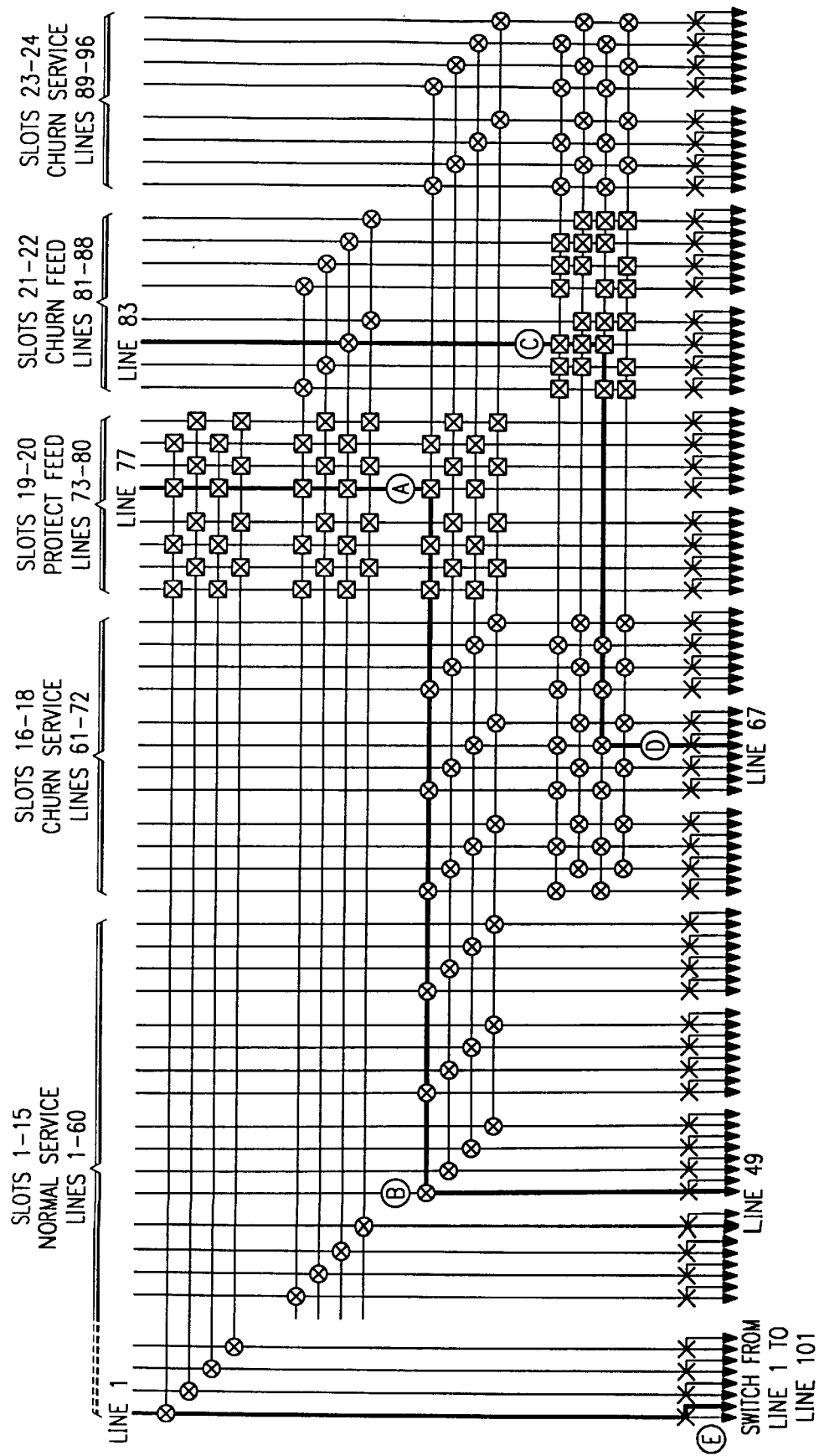

NOTE:
THIS FLOW ASSUMES THAT ESTABLISHED LOCAL PROCEDURES FOR SETTING UP LITESPAN CROSS-CONNECTIONS FOR TR-057, TR-008, OR TR-303 SERVICES HAVE BEEN COMPLETED PRIOR TO BEGINNING THIS NEW SERVICE ESTABLISHMENT PROCEDURE USING THE SFID.

METHOD AND APPARATUS FOR REMOTELY ACTIVATING SERVICES IN A TELECOMMUNICATIONS NETWORK

This application is a continuation of U.S. application Ser. No. 08/775,723 filed Dec. 31, 1996, now U.S. Pat. No. 5,912,960.

TECHNICAL FIELD OF THE INVENTION

The present invention relates in general to the telecommunications industry and more particularly to a method and apparatus for remotely activating services in a telecommunications network.

RELATED PATENT APPLICATION

This application claims the benefit of a U.S. Provisional Application No. 60/017,894, filed on May 17, 1996.

BACKGROUND OF THE INVENTION

Competition in the telecommunications industry is increasing as cable television companies and alternate providers prepare to deliver traditional telephone services. Additionally, new services that telephone companies are preparing to deliver will be subject to competition unlike anything they have experienced before. These factors indicate a growth in a turnover of services, or churn, by telecommunications customers. Whenever a telecommunications customer desires a new service, an additional line, or restoration of service, the telecommunications provider must dispatch a repair truck to the premises area to activate the service. Other solutions require over-provisioning of equipment, line cards, and feature sets that increase the cost and expense involved in providing additional services. Therefore, it is desirable to respond to customer requests for a change in service through efficient and automatic techniques.

SUMMARY OF THE INVENTION

From the foregoing, it may be appreciated that a need has arisen to remotely activate a service for a customer without dispatching a repair truck or through equipment over-provisioning. In accordance with the present invention, a method and apparatus for remotely activating services in a telecommunications network are provided which substantially eliminate or reduce disadvantages and problems associated with more costly and time consuming service activation techniques.

According to an embodiment of the present invention, there is provided an apparatus for remotely activating services in a telecommunications network that includes a first relay matrix that receives primary and secondary in-service feeds from a telecommunications network interface and provides primary and secondary service drops to local customers. A second relay matrix receives additional service feeds from the telecommunications network interface. The second relay matrix provides the additional service feeds to the initiation bus for transfer to the first relay matrix. Relays in the first and second relay matrices are remotely operated for the provisioning of services from the telecommunications network interface to the primary and secondary service drops according to the needs and desires of the local customers.

The present invention provides various technical advantages over conventional service activation techniques. For example, one technical advantage is to activate a service without dispatching a repair truck. Another technical advantage is to activate a service from a location remote from the telecommunications customer. Yet another technical advantage is to avoid over-provisioning of equipment while still responding to service activation requests. Other technical advantages are readily ascertainable by one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 6 illustrates a connection layout between relay matrices in the service and facility initiation device.

DETAILED DESCRIPTION OF THE INVENTION

Figure 1:
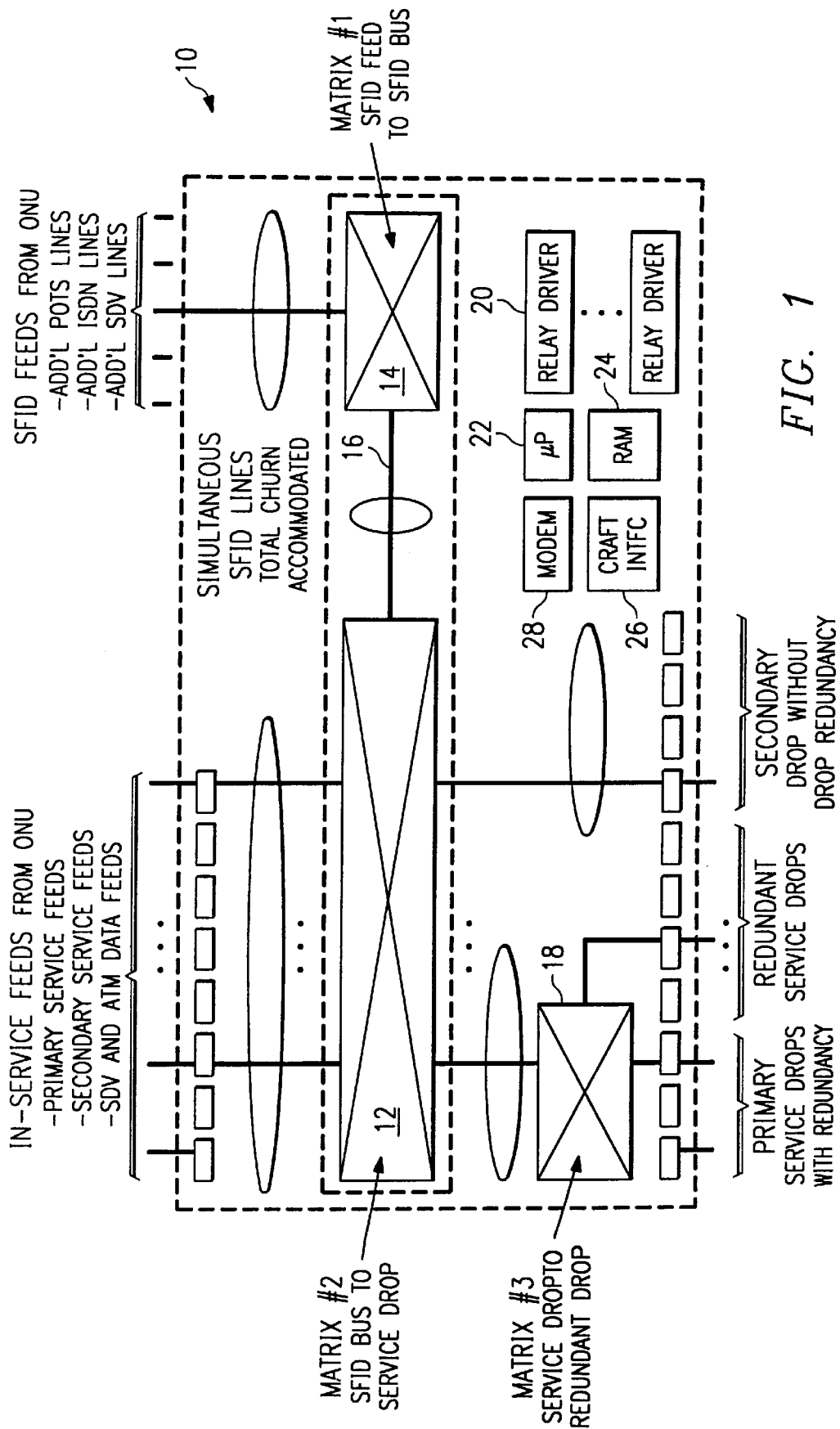
FIG. 1 illustrates a block diagram of a service and facility initiation device.

FIG. 1 is a block diagram of a service and facility initiation device 10. Service and facility initiation device 10 includes a first relay matrix 12 that may be designed to receive any number of primary and secondary in-service feeds from a telecommunications network interface, such as an optical network unit or other remote terminal equipment, in order to provide telephony, video, and data to local customers. Service and facility initiation device 10 also includes a second relay matrix 14 that may be designed to receive any number of additional service feeds from the telecommunications network interface in order to facilitate changes in services demanded by the local customers. First relay matrix 12 and second relay matrix 14 are coupled by a initiation bus 16. Initiation bus 16 may have a number of bus lines greater than, less than, or equal to a number of additional service feeds received by second relay matrix 14. Service and facility initiation device 10 may also include a third relay matrix 18 to provide for redundant service drops from the primary service drops associated with the primary in-service feeds. Secondary service drops associated with the secondary service feeds are provided by first relay matrix 12 and contemplated without redundancy.

First relay matrix 12, second relay matrix 14, and third relay matrix 18 provide for efficient cross-connection of primary and secondary in-service feeds and additional service feeds. First relay matrix 12, second relay matrix 14, and third relay matrix 18 are controlled by relay drivers 20 under the supervision of a processor 22. A memory 24 provides storage of control information accessed by processor 22. Local communication capability is provided through a craft interface 26 and remote communications with service and facility initiation device 10 is provided through a modem 28, or other communications interface.

Figure 2:
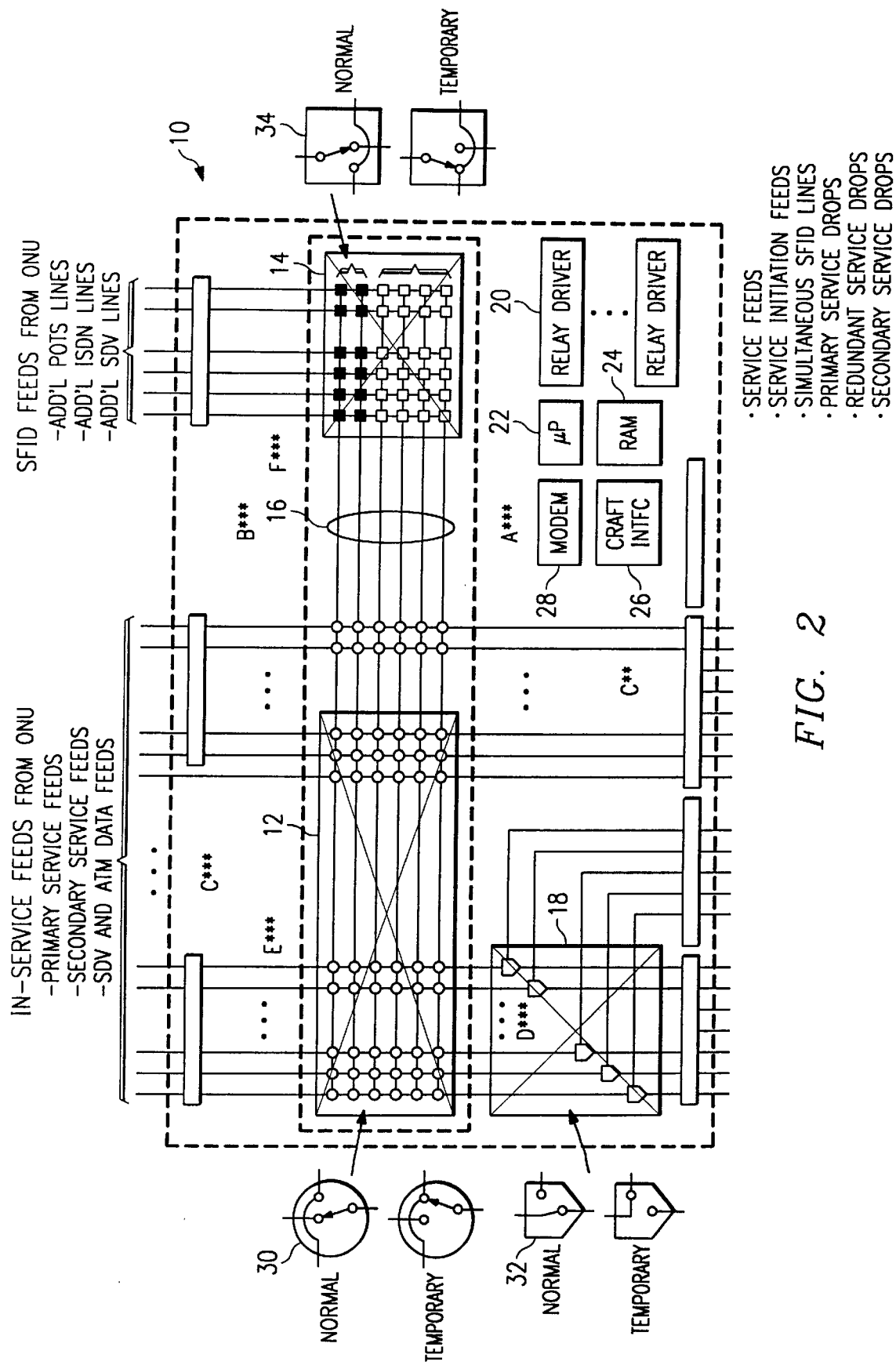
FIG. 2 illustrates a simplified schematic of the service and facility initiation device.

FIG. 2 shows a relay layout for service and facility initiation device 10. Relays 30 within first relay matrix 12 are normally set to pass through the primary and secondary in-service feeds from the telecommunications network interface. Relays 32 within third relay matrix 18 are normally set to pass through the primary in-service feeds to the primary service drops. Relays 34 within second relay matrix 14 are normally set in the open position as additional service feeds are not required. Upon a demand for additional service by a local customer, service and facility initiation device 10 receives control information remotely through modem 28 or other communications interface for relay drivers 20 to properly set relays 30, 32, and 34 in order to provide the requested additional service to the local customer. Relays 34 are set to place the appropriate additional service feed unto initiation bus 16. Relays 30 are set to capture the additional service feed from initiation bus 16 for placement onto an appropriate primary/redundant or secondary service drop.

Through remote communications with service and facility initiation device 10, a new service (including a first or second POTS line, an ISDN line, a data line, and an on demand video line) may be turned on, a new line directing service to any copper pair may be activated, restoring service from a failed copper pair through a back-up copper pair, and restoring service from a failed line card to an operating line card, among other service provisioning all without dispatching a repair truck. Upon routine maintenance dispatches, service and facility initiation device 10 can be reset locally through craft interface 26 to accommodate the addition of services and free up the additional service lines and initiation bus 16 for future remote changes. Non-scheduled dispatches can be eliminated by this remote provisioning of services.

Figure 3:
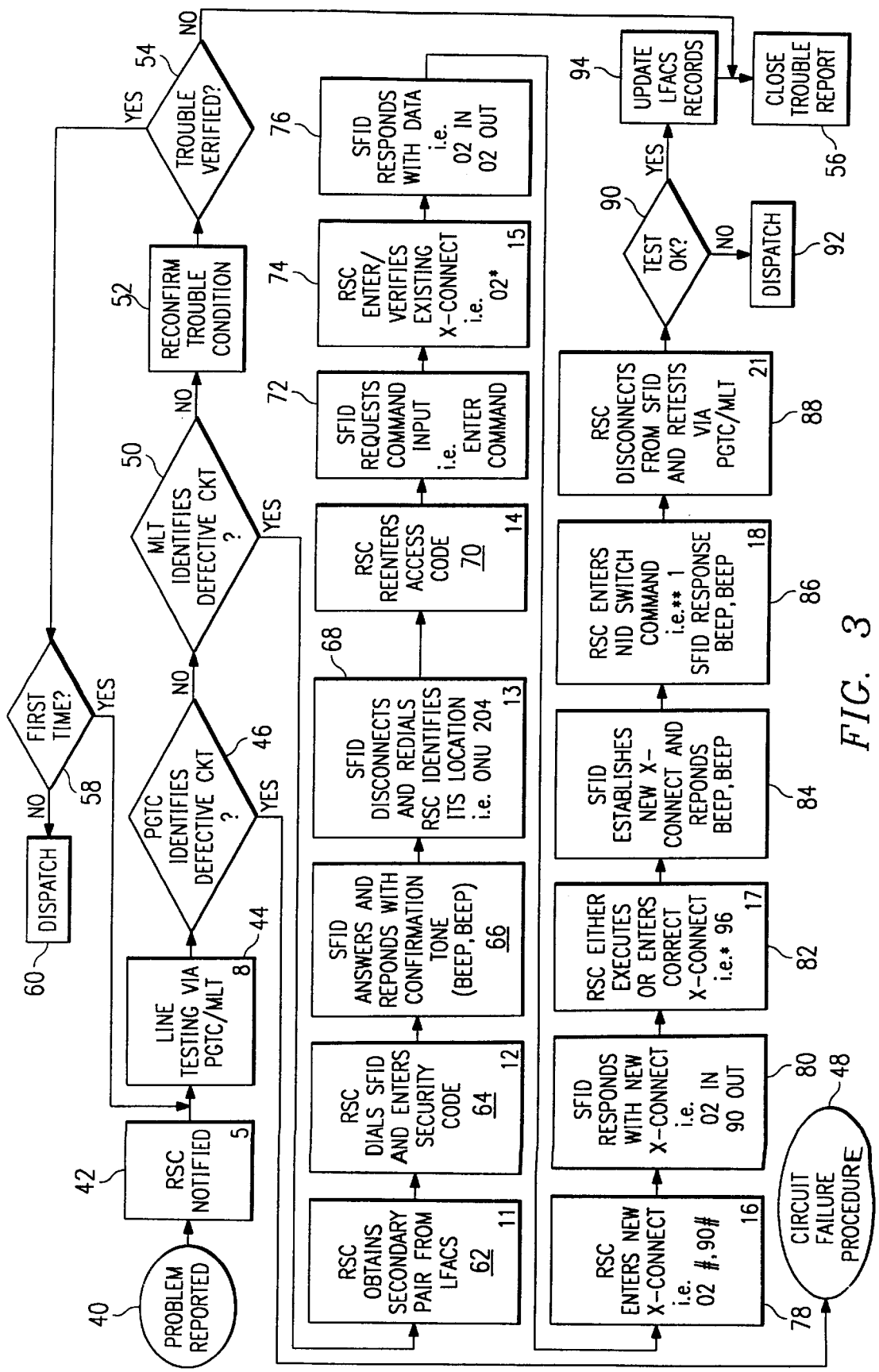
FIG. 3 illustrates a process flow for the remote configuration of the service and facility initiation device.

FIG. 3 shows the process flow for remotely configuring service and facility initiation device 10. The process flow begins at process step 40 where a problem in service or a demand for an additional service is reported. A Repair Service Center (RSC) is notified of the reported problem at process step 42 and proceeds to perform line testing through Pair Gain Test Control (PGTC) and Maintenance Line Testing (MLT) at step 44. If the PGTC identifies a defective circuit at process step 46, process flow proceeds to process step 48 where a circuit failure procedure is performed to correct the defective circuit. If the PGTC does not detect a defective circuit, a determination is made whether the MLT identified a defective circuit at process step 50. If the MLT did not find a defective circuit, the reported problem is reconfirmed at process step 52. If the reported problem was not verified at process step 54, the trouble report is closed at process step 56 and no further analysis is performed. If the trouble was verified and this was not the first time this problem has occurred, process step 58 routes the reported problem for dispatch handling at process step 60. If this was a first time report, process flow returns to process step 44 for additional line testing.

If the MLT identified a defective circuit, process flow proceeds to process step 62 where the RSC obtains a new wire pair from a Loop Facilities Assignment and Control System (LFACS). The RSC then remotely connects to service and facility initiation device 10 at step 64 to establish remote communications. At process step 66, service and facility initiation device 10 answers the RSC call, confirms any security measures implemented to establish communications, and provides an appropriate response to the RSC. Optionally, service and facility initiation device 10 may disconnect from and reconnect to the RSC in order to identify its location at process step 68 and have the RSC re-enter the appropriate access code to properly establish a communication link at process step 70.

Once a proper communication link has been established, service and facility initiation device 10 requests a command input from the RSC at process step 72. The RSC responds at process step 74 by entering the existing cross-connect configuration for a particular relay for verification. Service and facility initiation device 10 responds with the current cross-connect configuration at process step 76. At process step 78, the RSC enters a new cross-connect configuration. Service and facility initiation device 10 responds with the new cross-connect configuration at process step 80 for verification by the RSC at process step 82. At this point, the RSC may either execute the new cross-connect configuration or return to process step 78 to enter a correct cross connect configuration. When verification of the new cross-connect configuration is received from the RSC, service and facility initiation device 10 establishes and confirms the new cross-connect configuration at process step 84 by appropriately setting relays 30, 32, and 34 in first relay matrix 12, second relay matrix 14, and third relay matrix 18, respectively. At process step 86, the RSC enters a Network Interface Device (NID) switch command which is confirmed by service and facility initiation device 10. The RSC disconnects the communication link to service and facility initiation device 10 at process step 88 and begins the PGTC/MLT line testing. If the line tests found a defective circuit at process step 90, then dispatch handling is performed at process step 92. If the line testing verified proper circuit operation, the LFACS records are updated with the new cross-connect configuration at process step 94 and the trouble report is cleared at process step 56.

Figure 4:
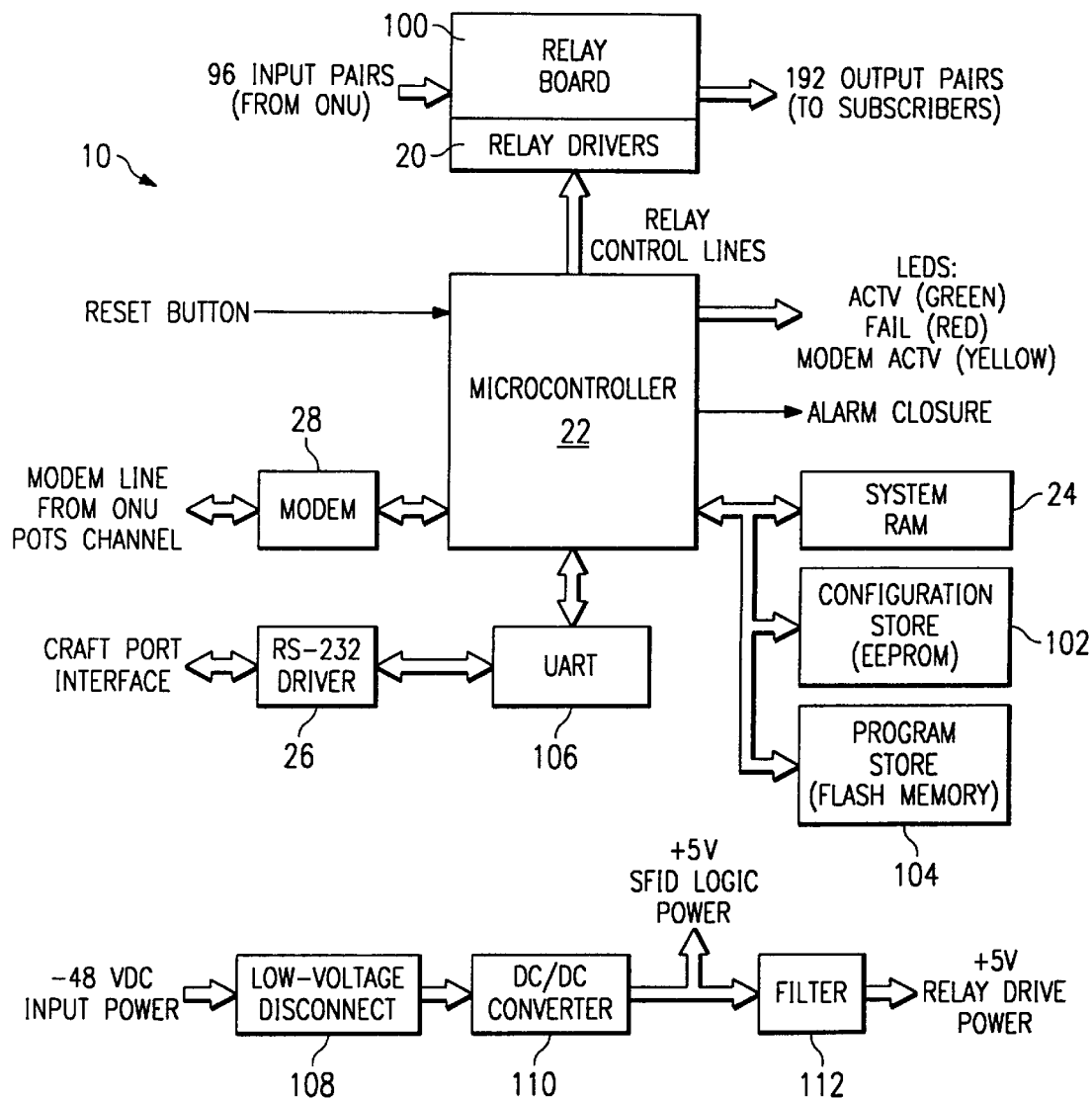
FIG. 4 illustrates a functional block diagram of the service and facility initiation device.

FIG. 4 is a functional block diagram of service and facility initiation device 10. In this configuration, a relay board 100 that includes first relay matrix 12, second relay matrix 14, and third relay matrix 18 receives 96 tip/ring subscriber pairs at its input and provides 192 tip/ring subscriber pairs at its output. The relay matrix configuration is stored in a configuration store memory 102 along with a database of user identifications, passwords, a connection log, and a configuration log. Firmware for microcontroller 22 is stored in a program store memory 104. Microcontroller 22 is reset at power up and may also be reset using a reset button on the front panel of service and facility initiation device 10. Microcontroller 22 may also be reset by a watchdog timer or by a software command through a user interface accessed over modem 28 or craft port interface 26 and universal asynchronous receiver/transmitter (UART) 106. A reset will not cause a service interruption due to the use of latching relays in each of the relay matrices.

Microcontroller 22 drives three light emitting diodes on the front panel to indicate the operational state of service and facility initiation device 10. A green ACTV LED is lit when power is applied and when the operating state is normal. A red FAIL LED is lit whenever a fault other than loss of input power is detected. A yellow MODEM ACTV LED is lit to indicate that a communications link has been established through the modem port and that the local craft port is inaccessible. Service and facility initiation device 10 is powered using a −48 volt DC voltage source provided from the appropriate network interface unit, such as an optical network unit, that provides the 96 tip/ring subscriber pairs. A low voltage disconnect circuit 108 supports battery powered applications. A DC to DC converter 110 converts the −48 volt DC supply to a +5 volt DC supply required for operation of logic and relay drivers 20 in service and facility initiation device 10. A filter 112 is used for providing a +5 volt DC supply for powering the relay matrices.

Figure 5:
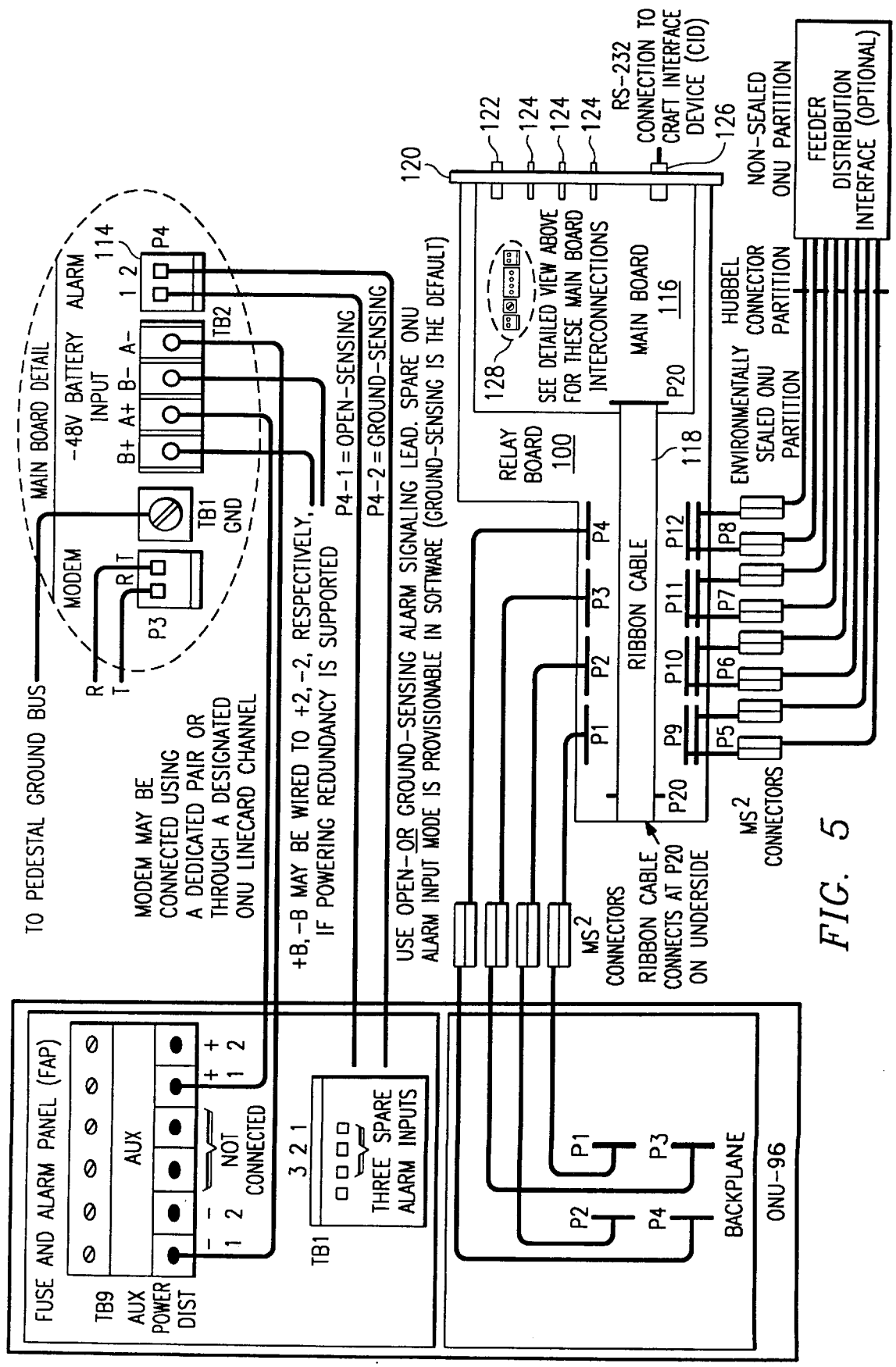
FIG. 5 illustrates a block diagram showing interconnections for the service and facility initiation device.

FIG. 5 is a block diagram showing interconnections for service and facility initiation device 10. For the input side connections, relay board 100 is connected through four 25 pair binder stubs originating at 54 pin connectors P1–P4. These binder stubs are terminated using MS², 710, or AMP connectors which are mated with respective MS², 710, or AMP connectors on the stubs from the network interface unit. For the output side connections, eight 25 pair binder stubs originating at 54 pin connectors P5–P12 are also terminated with MS², 710, or AMP connectors.

Microcontroller 22 and the other control and logic functions for service facility and initiation device 10 are located on a main board 116. Main board 116 is preferably connected to relay board 100 through a ribbon cable 118. Main board 116 connects to front panel 120 that includes a reset button 122, LEDs 124, and interface 126 for craft connection. Main board 116 also has connections 128 for alarm contacts, −48 volt DC battery input, ground, and modem. Alarm contacts 114 are provided by wire wrap pins to provide an external indication of an alarm condition. The alarm contacts 114 may be wired to provide either an open or ground connection alarm indication. Alarm contacts 114 are preferably rated for a maximum current of 0.24 amperes.

FIG. 6 shows an example of connections between first relay matrix 12, second relay matrix 14, and third relay matrix 18. Input lines 1–60 are normal service lines based on typical slot utilization for a network interface unit. Input lines 61–72 and 89–96 are devoted to high churn services where high turnover of alternate service is anticipated. Input lines 73–80 are dedicated to equipment protection. If a channel unit for one of the normal service or high churn lines should fail, one of the protection units may be brought into service for that output subscriber pair after the appropriate redirection of service.

Relay board 100 uses latching relays to prevent state changes when microcontroller 22 is reset or in the event of power loss. Microcontroller 22 periodically attempts to force each relay into a specified operating state. As an example of channel unit restoration in the event of failure in a channel unit serving line 49, the cross-connection with that subscriber service must be redirected to an equivalent type protection channel unit that supports in this instance line 77. Service and facility initiation device 10 can be used to actuate the relay at point A causing the channel unit feeding line 77 to be placed on initiation bus 16. Service facility initiation device 10 is then directed to actuate the relay at point B, cutting the passthrough input, and routing the signal on line 77 on initiation bus 16 generated at the channel unit to line 49.

For an example of high churn services, a customer may wish to try basic rate ISDN service on line 67 that is currently supplying POTS service. The customer service is cross-connected to an ISDN channel unit serving line 83. Service and facility initiation device 10 is then instructed to actuate the relay at point C, placing the ISDN channel unit on initiation bus 16. Service facility initiation device 10 then actuates the relay at point D, cutting the passthrough input from the POTS service and placing the ISDN service from initiation bus 16 onto the customer's drop at line 67. Should the customer later wish to discontinue his ISDN connection and return that line to POTS service, service and facility initiation device 10 can release the relays to return line 70 to its original pass through operation. As an example of subscriber drop restoration, each of the 96 input lines has a relay on the output which may be used to select either a primary or redundant output pair. An input line may be switched to a redundant output if a failure on the primary output is detected. Service and facility initiation device 10 is instructed to actuate the relay at point E in order to switch from a primary to a redundant output upon detection of a failure in the primary output. For example, if the primary drop for input line 1 is damaged, service and facility initiation device 10 can switch the output to the redundant drop of line 101.

FIGS. 7A–D show in more detail a process flow for remotely configuring service and facility initiation device 10. The process flow begins at FIG. 7A where trouble is reported at process step 200. The RSC is notified of the reported problem at process step 202 and proceeds to perform PGTC/MLT procedures at process step 204. If a channel unit is found to be defective at process step 206, process flow proceeds to process step 208 where channel unit restoration is to be performed as to be discussed with respect to FIG. 7B. If there is no channel unit failure but a failure is found in a subscriber drop at process step 210, then process flow proceeds to process step 212 where subscriber drop restoration is performed as to be discussed at FIG. 7C.

If no channel unit or subscriber drop failure has been detected, line testing procedures are performed at process step 214 to retest for the trouble condition. If the trouble no longer exists at process step 216, then process flow proceeds to process step 218 where the trouble report is closed. If the trouble still remains, a determination is made at process step 220 to determine whether the previous process steps have been performed more than once. If not, then the process steps are repeated beginning at process step 204 to verify the reported trouble. If the process steps have been executed more than once, process flow proceeds to process step 222 to initiate service dispatch. A new service request may be received at process step 224 that results in performance of new service establishment at step 226 as to be discussed at FIG. 7D.

Figure 7A:
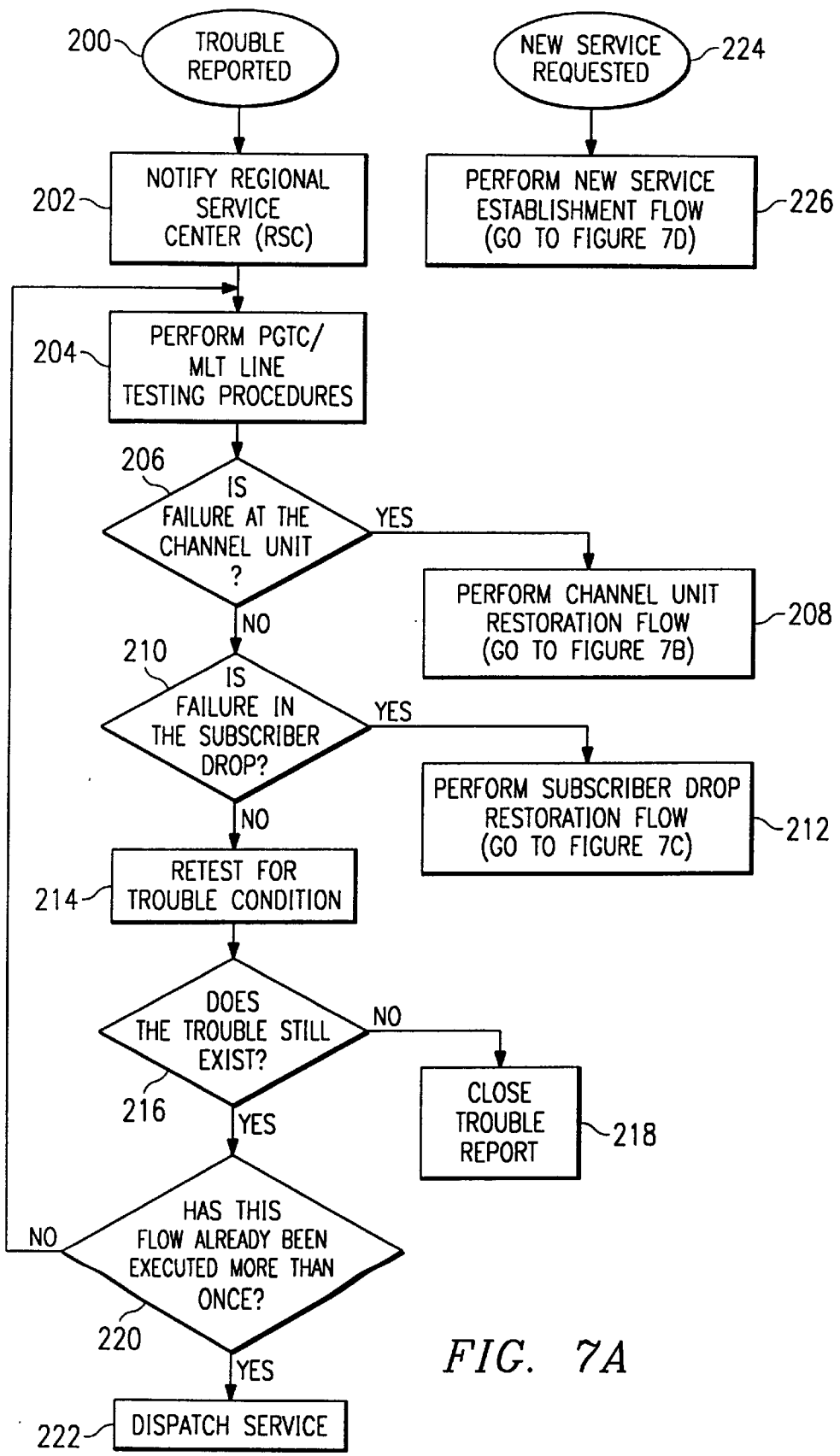
FIGS. 7A–D illustrate a process flow for remotely configuring the service and facility initiation device.
Figure 7B:
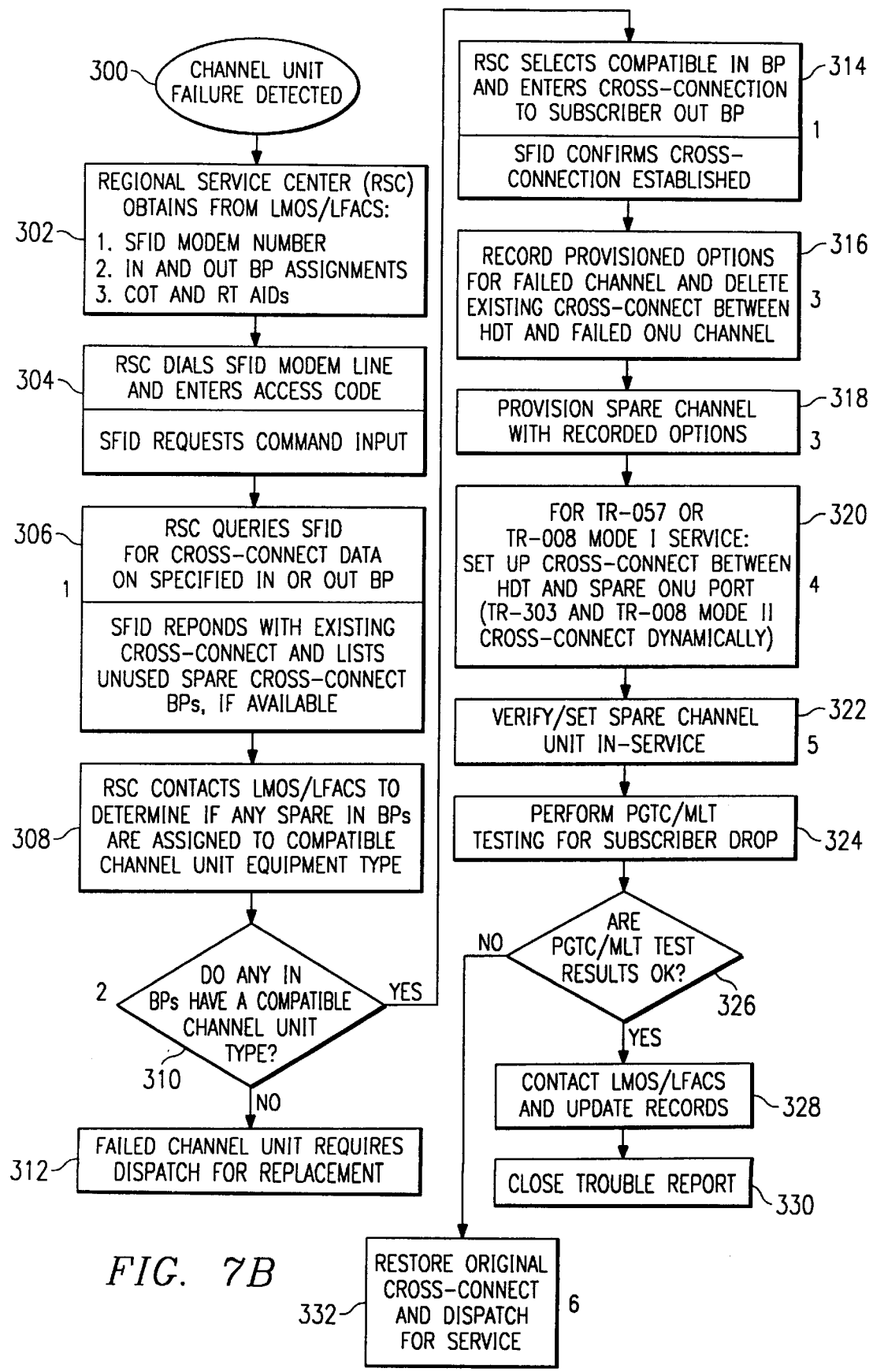

For a channel unit failure, process flow proceeds to FIG. 7B at process step 300. Channel unit restoration procedures are initiated at process step 302 where the RFC obtains the modem number or other remote communication access port for service and facility initiation device 10, IN and OUT binding post assignments for service and facility initiation device 10, and terminal identifications. At process step 304, the RFC accesses the remote communication line for service and facility initiation device 10 and enters an access code. Service and facility initiation device requests a command input from the RFC. Process flow proceeds to process step 306 where the RFC queries for cross-connect data on specified IN or OUT binding posts of service and facility initiation device 10. Service and facility initiation device 10 responds with existing cross-connect data and lists unused spare cross-connect binding posts.

At process step 308, the RFC contacts the LFACS to determine if any spare IN binding posts are assigned to compatible channel unit equipment types. If a determination is made that there are no compatible channel unit types at process step 310, then process flow proceeds to process step 312 to initiate service dispatch. If a compatible channel unit type is available, process flow proceeds to process step 314 where the RFC selects the compatible IN binding posts and enters cross-connection change to the subscriber OUT binding post. Service and facility initiation device 10 confirms that the cross-connection change has been established.

Process flow proceeds to process step 316 where the cross-connect to the failed channel unit is deleted. At process step 318, the spare channel is provisioned with recorded options. The cross-connect to the new channel unit is established at process step 320 and the spare channel unit is activated for service at process step 322. Line testing is performed at process step 324 and if results of the line testing are satisfactory at process step 326, then the LFACS is contacted and updated with the new cross-connect information at process step 328. Upon updating the records, process flow proceeds to process step 330 where the trouble report is closed. If a failure is still detected by the line testing procedures at process step 326, then the original cross-connect is re-established at process step 332 and service dispatch is initiated.

Figure 7C:
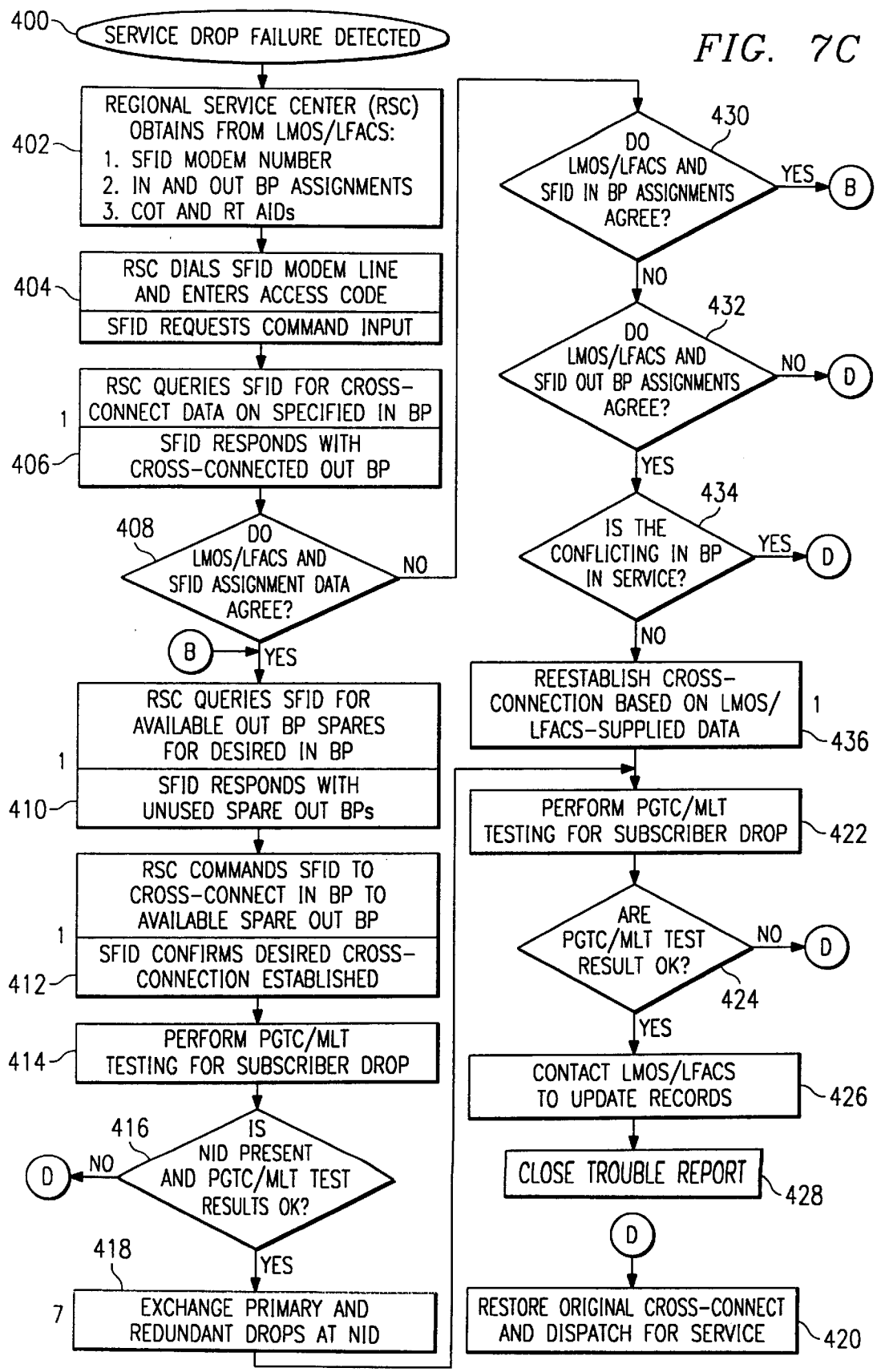

For failure in subscriber drops, process flow proceeds to FIG. 7C at process step 400. At process step 402, the RFC obtains the modem number or other remote access communication port and binding post assignments for service and facility initiation device 10 and the proper identifications from the LFACS. At process step 404, the RFC accesses the remote communication line of service and facility initiation device 10 and enters the access code. Service and facility initiation device 10 requests a command input from the RFC. At process step 406, the RFC queries service and facility initiation device 10 for appropriate cross-connect data and service and facility initiation device 10 responds with the requested cross-connect data.

If the cross-connect data of service and facility initiation device 10 agrees with the cross-connect data at the LFACS at process step 408, the RFC obtains the available OUT binding post spare for the desired IN binding post at process step 410. Service and facility initiation device 10 responds with the unused spare OUT binding post. At process step 412, the RFC commands service and facility initiation device 10 to cross-connect the particular IN binding post to the available spare OUT binding post. Service and facility initiation device 10 confirms that the desired cross-connection has been established.

Once the cross-connection has been established, line testing procedures are performed at process step 414. If the line tests pass successfully at process step 416, the new output subscriber drop is exchanged at the external network interface device at process step 418. If the line test failed at process step 416, process flow proceeds to process step 420 where the original cross-connect is restored and service dispatch is initiated. After exchanging subscriber drops at process step 418, line testing is again performed at process step 422. If the line test passed at process step 424, process flow proceeds to process step 426 where the LFACS is contacted to update its record and the trouble report is closed at process step 428. If line testing indicates a failure at process step 424, process flow proceeds to process step 420 where the original cross-connect is restored and service dispatch is initiated.

If at process step 408 the assignment data for service and facility initiation device 10 does not agree with that of the LFACS, process flow proceeds to process step 430 to determine if the IN binding post assignments agree. If the IN binding post assignments agree then process flow proceeds back to process step 410 where the process continues as discussed above. If the IN binding post assignments do not agree at process step 430, a determination is made to see if the OUT binding post assignments agree at process step 432. If the OUT binding post assignments do not agree, process flow proceeds to process step 420 where the original cross-connects are restored and service dispatch is initiated.

If the OUT binding post assignments agree, a determination is made to see if the conflicting IN binding post is in service at process step 434. If the IN binding post is in service, process flow proceeds to process step 420 where service dispatch is initiated. If the conflicting IN binding post is not in service, process flow proceeds to process step 436 where cross-connection change is established based on the LFACS assignment data. Once the cross-connection change has been established, process flow proceeds to process step 422 and continues as discussed above.

Figure 7D:
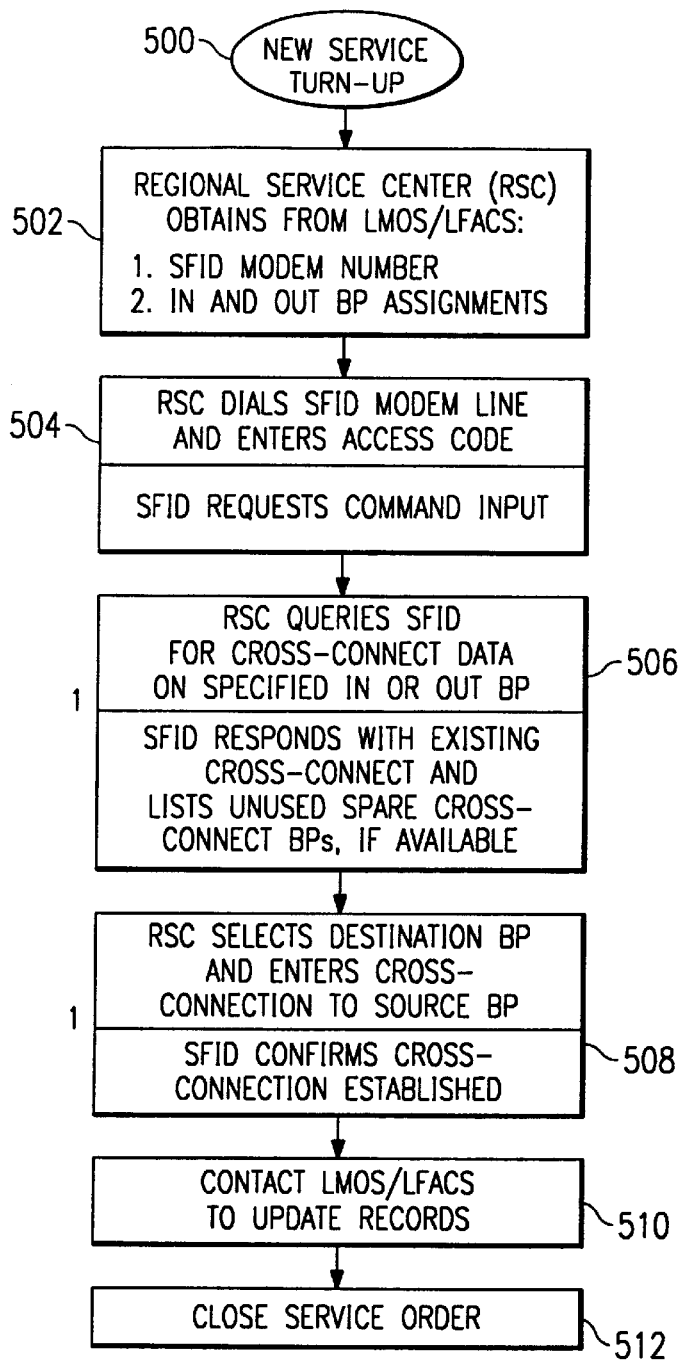

FIG. 7D shows a process flow for a new service request. Upon receipt of a new service request at process step 500, the RFC obtains the modem number and IN and OUT binding post assignments for service and facility initiation device 10 at process step 502. The RFC dials the modem line or other remote communication port and enters the access code while service and facility initiation device 10 responds with a request for a command input at process step 504. The RFC queries service and facility initiation device 10 for cross-connect data on specified IN or OUT binding posts at process step 506. Service and facility initiation device 10 responds with existing cross-connect configurations and lists unused spare and cross-connect binding posts. The RFC selects appropriate destination binding posts and enters cross-connection changes to source binding posts at process step 508. Service and facility initiation device 10 confirms that the cross-connection change has been established. At process step 510, the LFACS is contacted to update its records and the service order is closed at process step 512.

Operation of service and facility initiation devices is controlled through a built in menu driven interface accessible either remotely by modem or other remote communication port or locally through a craft interface port. An optional TL-1 interface with a user friendly menu package is available in other configurations of remote access. Once user interface communications have been established, service and facility initiation device 10 presents a text based user interface to permit logon and provisioning. The menu driven user interface consists of a number of screens which allow the local or remote user to access all functions of service and facility initiation device 10. Appendix A shows examples of user interface screens displaying appropriate prompts for accessing configuration data of service and facility initiation device 10.

In summary, a service and facility initiation device provides for remote cross-connect configuration in a telecommunications network in order to provide additional services as requested by local customers or restore services as needed without non-scheduled dispatch handling. Remote provisioning eliminates the delay and the expense that occurs in dispatching a repair truck for each additional service or restoration request.

Thus, it is apparent that there has been provided, in accordance with the present invention, a method and apparatus for remotely activating services in a telecommunications network that satisfies the advantages set forth above. Although the present invention has been described in detail, it should be understood that various changes, substitutions, and alterations readily ascertainable by one of skill in the art can be made herein without departing from the spirit and scope of the present invention as defined by the following claims.

What is claimed is:

1. A method for remotely activating services in a telecommunications network, comprising:

receiving primary and secondary in-service feeds at a first relay matrix;

providing primary and secondary service drops at the first relay matrix;

receiving additional service feeds at a second relay matrix;

configuring the first relay matrix and the second relay matrix;

providing the additional service feeds from the second relay matrix to the first relay matrix in response to the configuration;

providing the additional service feeds to the primary and/or secondary service drops in response to the configuration.

2. The apparatus of claim 1, further comprising:

receiving remote control information;

configuring the first relay matrix and the second relay matrix in response to the remote control information.

3. The apparatus of claim 1, further comprising:

receiving the primary in-service feeds at a third relay matrix from the first relay matrix;

providing the primary service drops and corresponding redundant service drops from the third relay matrix in response to the primary in-service feeds.

4. The apparatus of claim 1, further comprising:

receiving local control information;

reconfiguring the first relay matrix and the second relay matrix in order to clear the additional service feeds in response to the local control information.

* * * * *